United States Patent

[11] 3,542,151

| [72] | Inventor | Ferris F. Hamilton<br>320 High Street, Denver, Colorado 80218 |
|---|---|---|
| [21] | Appl. No. | 777,637 |
| [22] | Filed | Nov. 21, 1968 |
| [45] | Patented | Nov. 24, 1970 |

[54] AIRBORNE SEISMIC INPUT WEIGHT DROP DEVICE AND METHOD
7 Claims, 5 Drawing Figs.

| [52] | U.S. Cl. | 181/0.5 |
|---|---|---|
| [51] | Int. Cl. | G01v 1/04 |
| [50] | Field of Search | 340/15.5UM;<br>181/0.5 |

[56] References Cited
UNITED STATES PATENTS
2,717,656   9/1955   Bannister .................... 340/15.5

*Primary Examiner*—Rodney D. Bennett, Jr.
*Assistant Examiner*—Daniel C. Kaufman
*Attorney*—John E. Reilly ABSTRACT: In a method and apparatus for seismic operation, a weight drop device including a heavy slablike weight member is supported from a cable carried by an aircraft and is lowered toward the earth's surface at a selected location. Means are provided on the lower end of the weight member to transfer the weight of the load from the aircraft and as it is gradually lowered from the aircraft into contact with the earth's surface and support the weight member in spaced relation above the earth's surface. The cable is released from the device and the weight member will topple over to strike the ground and to generate a seismic input.

Patented Nov. 24, 1970

3,542,151

INVENTOR.
FERRIS F. HAMILTON
BY
ATTORNEY

AIRBORNE SEISMIC INPUT WEIGHT DROP DEVICE AND METHOD

This invention relates to seismic exploration and more particularly to a novel and improved weight drop device and method for seismic input. Weight devices which have heretofore been used to generate seismic inputs have for the most part utilized a wheeled vehicle such as a truck equipped with a boom arranged to elevate the weight to a preselected distance and then release it to free fall onto the earth's surface. While this procedure and the apparatus associated therewith has been suitable for generating seismic input waves it is apparent that there are many problems connected with the use of a truck so equipped.

Present day aircraft such as helicopters provide greater mobility and speed than trucks and are able to travel quickly to the location and to many locations which are not accessible to trucks. However there are some problems incidental to the deploying of a heavy weight from a helicopter including the effect on the craft of a sudden loss of a substantial load.

Accordingly it is an object of this invention to provide a new and improved method and weight drop device for generating a seismic input.

Another object of this invention is to provide a simple, durable and reliable weight drop device which may be deployed from an aircraft such as the helicopter without a sudden release of the entire weight of the device from the aircraft.

It is yet another object of this invention to provide a novel and improved heavy weight drop device which is easily carried by an aircraft in a suspended relation by a cable for producing a series of successive seismic inputs.

In accordance with the present invention there is provided a weight drop device which is carried by a cable from an aircraft and includes a weight member arranged with a depending support member which when lowered from above will contact the earth's surface and gradually release the weight from the aircraft and support the weight member above the earth's surface in a generally balanced condition. Upon release of the device by the aircraft, the device is so constructed and arranged to topple over to impact the ground.

Other objects, advantages and capabilities of the present invention will become more apparent as the description proceeds taken in conjunction with the accompanying drawings in which.

Figures 1, 2, 3:
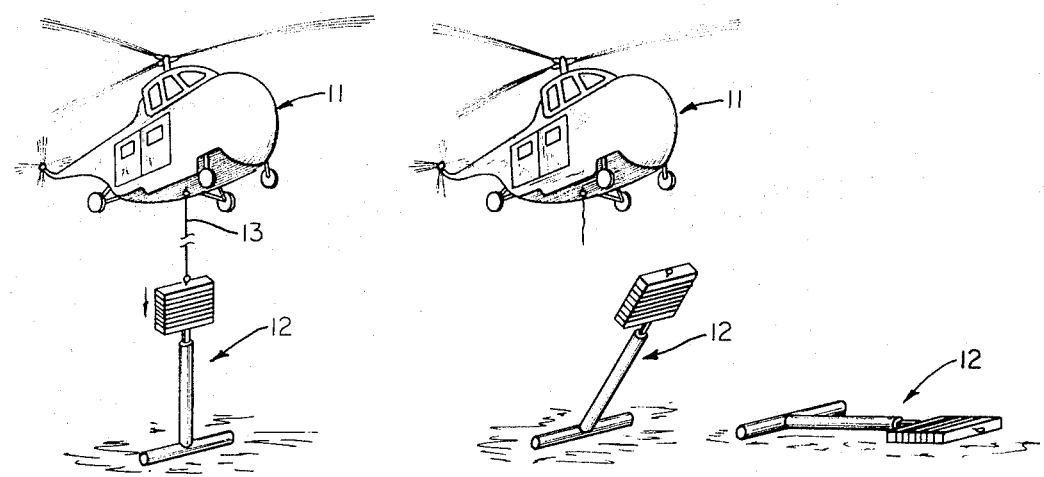
FIG. 1 is a generally schematic elevation view depicting the weight drop device being carried by a helicopter to a particular location and lowered into contact with the earth's surface.
FIG. 2 is a generally schematic elevation view depicting the weight drop device being released to topple over.
FIG. 3 is a generally schematic elevation view depicting the weight drop device in a generally horizontal position after it has impacted the earth's surface.
Figures 4, 5:
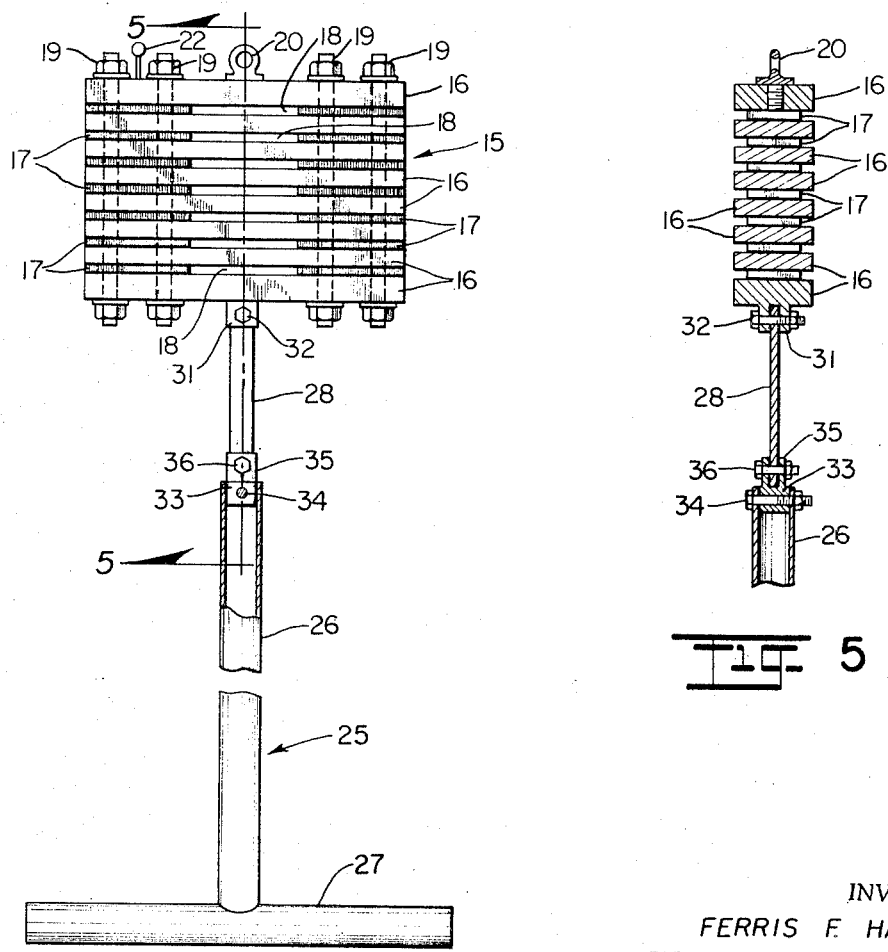
FIG. 4 is a side elevation view of a weight drop device embodying features of the present invention with a portion broken away to show interior construction.
FIG. 5 is a fragmentary end elevation view of the weight drop device taken along lines 5—5 of FIG. 4.

Referring now to the drawings, in FIGS. 1 to 3 there is schematically shown an airborne seismic exploration system illustrating the method of producing a seismic input using a weight drop device in accordance with the present invention. The apparatus shown includes an aircraft 11 which in the preferred form is a helicopter having a weight drop device 12 suspended therefrom by a cable 13 connected therebetween. The weight drop device 12 is shown in more detail in FIGS. 4 and 5 and comprises a slablike weight member 15 of generally oblong shape which is formed of a plurality of rectangular-shaped heavy plates or flat slabs 16 stacked one on top of the other and disposed in a spaced relationship by a series of spacers 17 to for form a plurality of recesses or spaces 18 in the sidewalls of the weight member. These spaces will tend to resist the sticking of the weight member in the mud when it impacts the earth's surface. Fasteners for holding the plate as an integral assembly are shown as four nut and bolt assemblies 19 which extend downwardly through aligned apertures in the stacked plates 16.

A hook ring 20 threads into the top plate which is adapted to receive the cable 13 carried in a depending manner from the aircraft. A G-switch 22 is mounted on the weight member which is arranged to transmit a signal back to the helicopter when a predetermined striking force is not generated by the weight member upon impact whereupon the helicopter may be picking up the weight drop device and drop it again.

For disposition of the weight member 15 in spaced relation above the earth's surface when it is lowered from the aircraft, there is provided an inverted T-shaped member 25 having an upright leg 26 depending downwardly from the weight member and a bottom leg 27 arranged in a transverse relation to the upright leg. This T-shaped member 25 is shown as formed of a metal tubing or hollow conduit. A flat yieldable spring member 28 is connected between the lower end of the weight member and the upper end of the T-shaped member 25 to flex when the weight member hits the ground. The particular connection between members 15 and 25 is a clevis portion 31 formed on the bottom of the lower plate and into which the upper end of the spring member is slidably inserted and a fastener 32 such as a threaded bolt extends through the clevis and the top of the flat spring member 28. A connecter 33 fits into the upper end of the T-shaped member and is secured thereto by a fastener 34 such as a threaded bolt and nut assembly. The upper end of the connecter 33 has a clevis portion 35 into which the lower end of the spring member 28 is slidably inserted and is secured thereto by fastener 36 such as a nut and bolt assembly.

In sequence, the weight drop device 12 is suspended from the cable and flown by the aircraft 11 to a preselected location as is shown in FIG. 1. The weight drop device 12 is then gradually lowered with the leg 27 contacting the earth's surface and the weight of the device being gradually transferred from the aircraft to the earth's surface as it is gradually lowered by the aircraft. During this time the weight drop device is in essentially a vertical position and is set down in a generally vertically balanced condition. After the weight of the device has been transferred from the aircraft to the earth the cable is then released and a weight drop device pivots an about leg 27 and topples or falls over in a toppling action to generate or strike the ground and generate a seismic input. After impact the helicopter which is hovering above may either retrieve the weight drop device and move it along to another location or during seismic input may have picked up another weight drop device to repeat this weight drop procedure for a series of seismic inputs along a preselected course of flight.

Although the present invention has been described with a certain degree of particularity, it is understood that the present disclosure has been made only by way of example and that changes in details of structure and system components may be made without departing from the spirit thereof.

I claim:

1. A seismic input weight drop device adapted for airborne carriage comprising a weight member arranged for suspension from an aircraft including support means depending downwardly from said weight member for disposition of said weight member in spaced relation above the earth's surface when the lower end portion of said support means is lowered into contact with the earth's surface from above, said lower end portion forming a pivot for the weight member about which the weight member will topple over and impact the earth's surface when released from above.

2. A seismic input weight drop device adapted for airborne carriage comprising a slablike weight member arranged for suspension from an aircraft by a cable and support means arranged in a depending manner from the weight member for disposing said weight member above the earth's surface when lowered downwardly from above and into contact therewith and forming a pivot for the weight member about its lower end portion about which said weight member will turn at a toppling action when released from above to impact the earth's surface.

3. A seismic input weight drop device adapted for airborne carriage comprising a weight member arranged for suspension from an aircraft including means depending downwardly from said weight member for disposition of said weight member in spaced relation above the earth's surface when the lower end portion of said support means is lowered into contact with the earth's surface from above, said lower end portion forming a pivot for the weight member about which the weight member will topple over and impact the earth's surface when released from above, said support means including an inverted T-shaped member having a downwardly depending leg and a ground contacting lower leg transverse to the depending leg forming a pivotal axis about which the weight member will rotate whereby said weight member will topple over and impact the earth's surface when released from above.

4. A seismic input weight drop device adapted for airborne carriage comprising a weight member arranged for suspension from an aircraft including support means depending downwardly from said weight member for disposition of said weight member in spaced relation above the earth's surface when the lower end portion of said support means is lowered into contact with the earth's surface from above, said lower end portion forming a pivot for the weight member about which the weight member will topple over and impact the earth's surface when released from above, said weight member being formed of a plurality of heavy flat plates stacked one above the other and held in a spaced-apart relationship to form a series of recesses in the walls of said weight member.

5. A seismic input weight drop device adapted for airborne carriage comprising a weight member arranged for suspension from an aircraft including support means depending downwardly from said weight member for disposition of said weight member in spaced relation above the earth's surface when the lower end portion of said support means is lowered into contact with the earth's surface from above, said lower end portion forming a pivot for the weight member about which the weight member will topple over and impact the earth's surface when released from above, and a flexible springlike member interconnected between said weight member and said depending means to provide flexure when the weight member impacts the earth's surface.

6. A seismic input weight drop device adapted for airborne carriage comprising a weight member arranged for suspension from an aircraft including support means depending downwardly from said weight member for disposition of said weight member in spaced relation above the earth's surface when the lower end portion of said support means is lowered into contact with the earth's surface from above, said lower end portion forming a pivot for the weight member about which the weight member will topple over and impact the earth's surface when released from above, said weight member having means for sensing the extent of the impact with the earth's surface.

7. A method of airborne seismic exploration comprising the steps of flying a weight drop device to a preselected location by an aircraft, gradually lowering a depending portion of the device into contact with the a earth's surface to transfer the weight of the device from the aircraft to the earth's surface while hovering above a location, and releasing the weight drop device from the aircraft to allow it to topple over and impact the earth's surface, generating a seismic input.